US007075531B1

(12) United States Patent
Ando et al.

(10) Patent No.: US 7,075,531 B1
(45) Date of Patent: Jul. 11, 2006

(54) METHOD OF CREATING ANIMATION IMAGE DATA FILES

(75) Inventors: Masao Ando, Aichi (JP); Zitsuya Kato, Aichi (JP)

(73) Assignee: Fuzie, Inc. (JP)

( * ) Notice: Subject to any disclaimer, the term of this patent is extended or adjusted under 35 U.S.C. 154(b) by 685 days.

(21) Appl. No.: 09/644,349

(22) Filed: Aug. 23, 2000

(30) Foreign Application Priority Data

Aug. 23, 1999 (JP) .................................. 11-236196
Jul. 18, 2000 (JP) .............................. 2000-217950

(51) Int. Cl.
*G06T 17/00* (2006.01)
(52) U.S. Cl. ..................................................... 345/420
(58) Field of Classification Search ................ 345/419, 345/473, 420, 615
See application file for complete search history.

(56) References Cited

U.S. PATENT DOCUMENTS

| 5,771,043 | A | | 6/1998 | Nigawara et al. ............ 345/419 |
| 5,831,875 | A | * | 11/1998 | Hirata et al. ..................... 703/7 |
| 5,872,902 | A | * | 2/1999 | Kuchkuda et al. .......... 345/615 |
| 6,295,063 | B1 | * | 9/2001 | Minami et al. .............. 345/419 |

FOREIGN PATENT DOCUMENTS

| EP | 0 813 169 A2 | | 12/1997 |
| EP | 813169 A2 | * | 12/1997 |
| JP | 63-293680 | | 11/1988 |
| JP | 6-215150 | | 8/1994 |
| JP | 10-11610 | | 1/1998 |

OTHER PUBLICATIONS

Micheal Todd Peterson, 3D Studio MAX 2 Fundamentals, 1998, New Riders Publishing, pp. 217-219, 259-261, 287, 399.*
Lengyel et al., Rendering With Coherent Layers, 1997, Addison-Wesley Publishing, pp. 1-9.*
Michael Peterson, 3D Studio MAX 2 Fundamentals, 1998, New Riders Publishing, pp. 217-219, 259-261, 263, 287, 399, 401.*
Atherton, A Method of Interactive Visualization of CAD Surface Models On A Color Video Display, ACM Computer Graphics, vol. 15, No. 3, Aug. 1981, pp. 279-287.*
P. Atherton; "A Method of Interactive Visualization of Cad Surface Models on a Color Video Display"; Computer Graphics; 15 (1981) pp 279-287 (XP 009008440).
S. Jayaram et al.; "Virtual Assembly Using Virtual Reality Techniques"; Computer-Aided Design; 29 (1997) pp 575-584.

(Continued)

*Primary Examiner*—Almis R. Jankus
(74) *Attorney, Agent, or Firm*—Osha Liang LLP (57) ABSTRACT

A method of efficiently creating an animation image data file is provided. Components of a device are modeled using a 3-D CAD system and filed. After file format conversion, the file is imported to application software for animation. The components are then assembled, a camera angle is selected, and the transparency of the components is specified. A video file is created and included in an HTML file which is a completed animation data file. A clear perspective of the device comprising complicated components can be obtained because some components created with 3-D CAD system are rendered transparent using the application software for animation.

14 Claims, 9 Drawing Sheets

OTHER PUBLICATIONS

K. Kremer; "A Concept For Virtual Reality Tools For Design Reviews"; Heinz Nixdorf Institute; pp 205-210 (XP-000887540).

A.Gomes de Sa et al.; "Virtual Reality As a Tool for Verification of Assembly and Maintenance Processes"; Computers & Graphics 23 (1999) 389-403.

European Search Report Dated May 2, 2003.

Data supplied from ESP@cenet database-12, Patent No.: JP63293680 dated Nov. 30, 1988, 1 page.

esp@cenet-Document Bibliography and Abstract, Patent No.: JP6215150 dated Aug. 5, 1994, 1 page.

esp@cenet-Document Bibliography and Abstract, Patent No.: JP10011610 dated Jan. 16, 1998, 1 page.

Association with Robots and Virtual Humans, Published by Nikkei BP on Aug. 8, 1999, pp. 106-117.

Notice of Grounds for Rejection for Japanese Patent Application Serial No. 2000-217950, Mailed Jun. 1, 2004 (4 pages in English).

* cited by examiner

METHOD OF CREATING ANIMATION IMAGE DATA FILES

BACKGROUND OF THE INVENTION

1. Field of the Invention

The present invention relates to a method of creating animation image data files for displaying an animated image of a given device made up of a plurality of components.

2. Description of the Related Art

Catalogs and instruction manuals describing products (given devices) in detail are used by sellers to explain the features of a product and by users to understand how to use or maintain the product. These catalogs and manuals are most commonly printed on paper, and usually include illustrations or static views of the product and components along with accompanying descriptive text. The drawings used in these catalogs and manuals have an inherent drawback in that the actual motion of a product is difficult for users to imagine, and, consequently, operating and maintenance methods are often difficult to understand.

Many types of animation image data files are now available and, as the computer application scope expands, catalogs including animation image data files are more commonly being made available for access through web sites. Animation images help users to more easily understand the operation of a given device.

Conventional animation image data files are normally created using animation software. With such animation software, generating complex shapes remains difficult and time-consuming work, particularly for a given device made by combining many components. In order for viewers to visualize its assembly and disassembly processes, the shapes of the components must be highly accurate. Creating a data file for this purpose requires a lot of labor.

Moreover, when a component data file is created with animation software, dividing a component into a plurality of blocks and generating data for each is a common method of dealing with a single component whose shape is complex and difficult to render. Because each block has its shading, this technique leads to a problem that perspective views generated by combining discrete data generated for the blocks of the component are not clear.

Manufacturing drawings and computer-aided design (CAD) data for the given device are required for the software to generate models of the components of any device. Programs are known that generate three-dimensional CAD data from two-dimensional CAD data. Thus, three-dimensional CAD data can be generated from the original data for the components to make the components visible on a display.

However, because three-dimensional CAD data generated by these tools is basically for displaying static images, difficulties have been encountered when attempts have been made to display animation images from such data. Particularly, to display animated images of disassembling a given device comprising a plurality of components into the components and their maintenance status, a new rendering solution is required. Developing such programming is another problem with the related art.

Still another problem has been encountered that the animation data created by using the unprocessed three-dimensional CAD data has an enormous data volume, and therefore can be handled only by large-scale computers.

SUMMARY OF THE INVENTION

An object of the invention is to provide methods of creating animation image data files whereby an animation image data file of a device made up of a plurality of components can be created efficiently.

As a feature of the present invention, a method for creating animation image data files comprises the steps of generating individual three-dimensional models of components of a given device using a three-dimensional CAD system, and combining a plurality of generated three-dimensional component models to form a set of three-dimensional component models of the given device. After the thus obtained set of three-dimensional component models is imported into application software for animation, the components are colored using a function of the software and the transparency of a desired component or components is simultaneously specified, so that internal components are visible on a display.

Because the component models are generated with a three-dimensional CAD system, even complex components can be modeled in a straightforward manner as single components. Furthermore, because a component is selected and specified transparent from the application software for animation, the selected component can be rendered transparent as a single component. Thus, an animation data file can be created that makes it possible to provide an effective and clear perspective of a device with certain components rendered transparent.

Particularly, because data for a set of three-dimensional component models formed by combining a plurality of generated three-dimensional component models is imported to application software for animation, data for each component is held in the software, and, consequently, internal components can be made visible by specifying outer components as being transparent.

When performing the operation of specifying the transparency of a component, a component to become transparent after a certain elapsed display time is preferably preset by specifying a time at which the component becomes transparent.

Further, when performing the operation of specifying the transparency of a component, a level of transparency is preferably specified.

In another aspect of the present invention, a method of creating animation image data files comprises the steps of generating individual three-dimensional models of components of a given device using a three-dimensional CAD system, and combining a plurality of generated three-dimensional component models to form a set of three-dimensional component models of the given device. After the thus obtained set of three-dimensional component models of the given device is imported into application software for animation, the components are colored using a function of said software, and a tenuous color-filming component fitting the shape of a partial area of a desired component is simultaneously generated specifying a certain color of the color-filming component to color the partial area of the component.

This manner of separately generating the tenuous color-filming component enables operators to paint the target area and the remaining area of the component with different colors by specifying distinct colors for the color-filming component and for the component on which the color film is placed. Thus, the method enables the efficient creation of an animation image data file, while reducing the total data quantity.

Preferably, the above partial surface of a component is flat.

According to a further aspect of the invention, a method of creating animation image data files comprises the steps of generating individual three-dimensional models of components of a given device using a three-dimensional CAD system, and combining a plurality of generated three-dimensional component models to form a set of three-dimensional component models of the given device. After the thus obtained set of three-dimensional component models of the given device is imported into application software for animation, an image is created for each component using a function of the software. The components are combined to form separate groups of components to be rendered transparent and not to be rendered transparent, and images of both groups of components are displayed in an overlapping manner, so that internal components are visible on a display.

This manner of forming separate groups of components to be rendered transparent and not to be rendered transparent eliminates the need for specifying transparency for each component by assigning a pale color substantially transparent to the color attribute of the group of components to be rendered transparent. As a result, transparency specification process can be simplified, to thereby reduce the time required for the process. Further, because the color attribute is assigned to the outer appearance of the component group to be rendered transparent, penetration holes and the like in invisible areas do not stand out in the image, and therefore a beautiful picture can be obtained.

According to a further aspect of the present invention, a method of creating animation image data files comprises the steps of generating individual three-dimensional models of components of a given device using a three-dimensional CAD system, and combining a plurality of generated three-dimensional component models to form a set of three-dimensional component models of the given device. After data of the thus obtained set of three-dimensional component models of the given device is converted into a format importable into application software for animation, the converted data is imported to the application software for animation, so that the shape of a product can be displayed with two-dimensional animation using the application software for animation.

The created animation image is used for describing assembly and disassembly processes to maintain said given device.

In the field of manufacturing, a drawing is first created for a product to be manufactured, and used to actually manufacture the product. As the drawing is created with 3-D CAD tools, 3-D CAD data is often generated for each product. In building or remodeling new factory facilities as well, each facility is designed using 3-D CAD tools, and therefore 3-D CAD data is generated for various components making up the facility.

Meanwhile, instruction manuals describing operation and facility maintenance procedures are produced. However, these manuals printed on paper are not helpful enough for operators to understand the procedures. Even a moving picture of the operation procedures captured with a video camera does not sufficiently help operators to understand the working procedures because operators, other machines and devices, and components thereof in the picture block the view, or because viewers cannot see the inside.

On the other hand, animation images can provide a good explanation easily understood by viewers. However, creation of animated images requires an enormous amount of labor, and it is difficult to express accurate shapes with the animated images.

By utilizing the 3-D CAD data and converting it to be imported to application software for animation as in the present invention, an accurate shape can be easily created in the animation. Further, such animation can be viewed on a notebook personal computer and the like by deleting unnecessary data and creating two-dimensional animation. Internal components can be made visible in animation by specifying them transparent, so that operation procedures can be presented without any operators, other machines and devices, and components thereof blocking the view, and thus easily understood by viewers.

The above-described animated image is preferably used for providing a presentation of said given device. The animation image created by using 3-D CAD data is highly accurate in size and the like, and thus can be used for a presentation to simulate the actual device.

Preferably, the above product is a factory facility, and the above component is the device building up the facility. The created animation image is preferably used for providing a presentation of the factory facility.

While conventionally miniature models are made for planning a layout of factory facilities, it is difficult to imagine motion of devices and people with such models. On the contrary, using animation, motions of the devices and people can be easily simulated.

Although expressing elements in accurate shapes are difficult if animated image data must be created from scratch with animation, each element can be expressed in its accurate shape by importing the data formed with CAD into application software for animation.

It is also preferable to add data for human motion picture using application software for animation, to thereby easily simulate human motions.

The present invention also provides a medium on which the data files created as described above are stored. The medium may be in any form as long as data can be stored thereon, including a CD-ROM and a floppy disk. Data may also be provided through communication.

DESCRIPTION OF THE PREFERRED EMBODIMENT

A preferred embodiment of the present invention (hereinafter referred to as the embodiment) will be explained below, based on the drawings.

Figure 1:
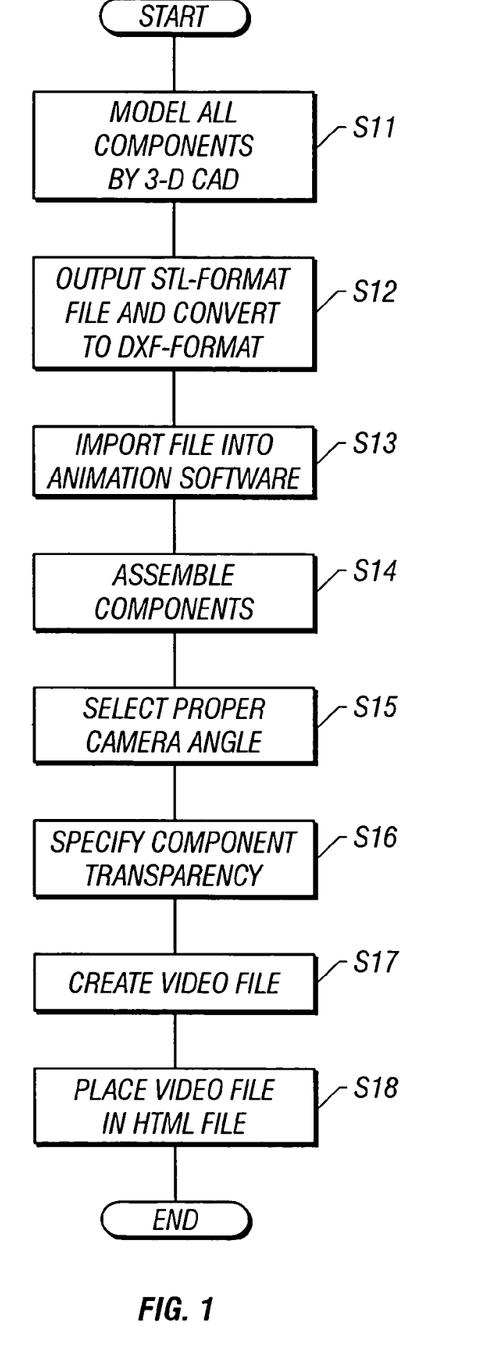
FIG. 1 is a flowchart explaining the operation process of creating an animation data file.

A method of creating animation image data files, as implemented in this embodiment, will be explained in the procedure below while referring to FIG. 1.

From among the data of all types, including drawings, photographs, and detail specifications, for all components of a device, the components are first modeled using a three-dimensional (3-D) CAD system, generating model data (S11). Here, the 3-D CAD system is assumed to have the capability of generating 3-D CAD data from available two-dimensional CAD data, such as data obtained from drawings. Thus, any available two-dimensional data can be used as raw data for generating 3-D CAD data.

The thus obtained 3-D CAD model data for all components is output in an STL-format that is in turn converted into a DXF-format file (S12). The STL-format, in which any surface of a solid model is represented as a set of small triangles, is widely used in 3-D CAD. The DXF-format, which is available for the AUTOCAD (trademark) system produced by the company TODESK, can be used for types of 3-D CADs and a wide range of graphic software products support this file format.

Figure 2A:
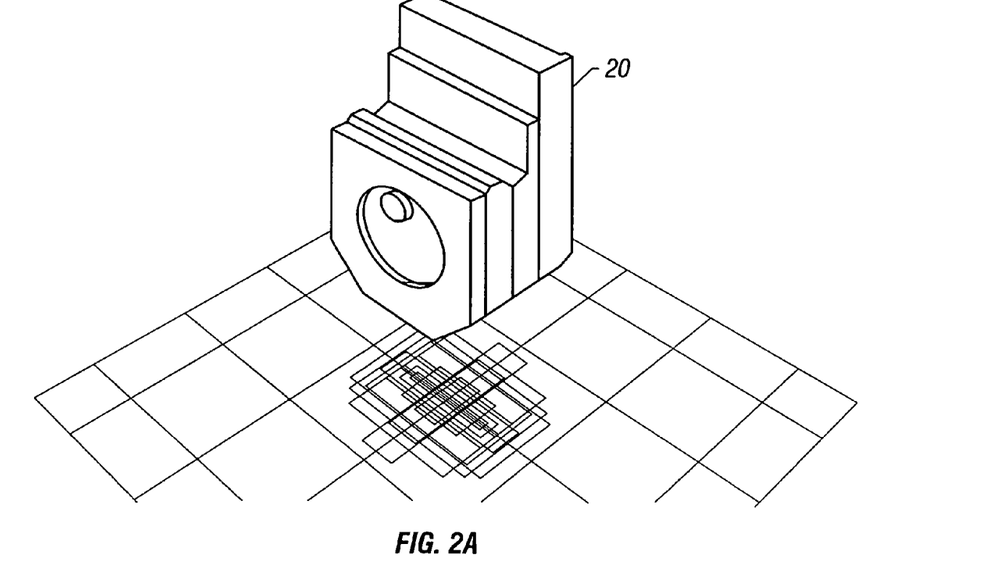
FIGS. 2A and 2B are illustrations showing example displays for component assembly.

Animation software (such as the commercially available LAY DREAM STUDIO (trademark)) is used to read the DXF-format file of the model data for all components (S13). With this software, the model data for all components is opened so as to display the component models on the screen. Then, from the model data, an assembly of all component models is displayed as a black block 20 as shown in FIG. 2A.

Figure 2B:
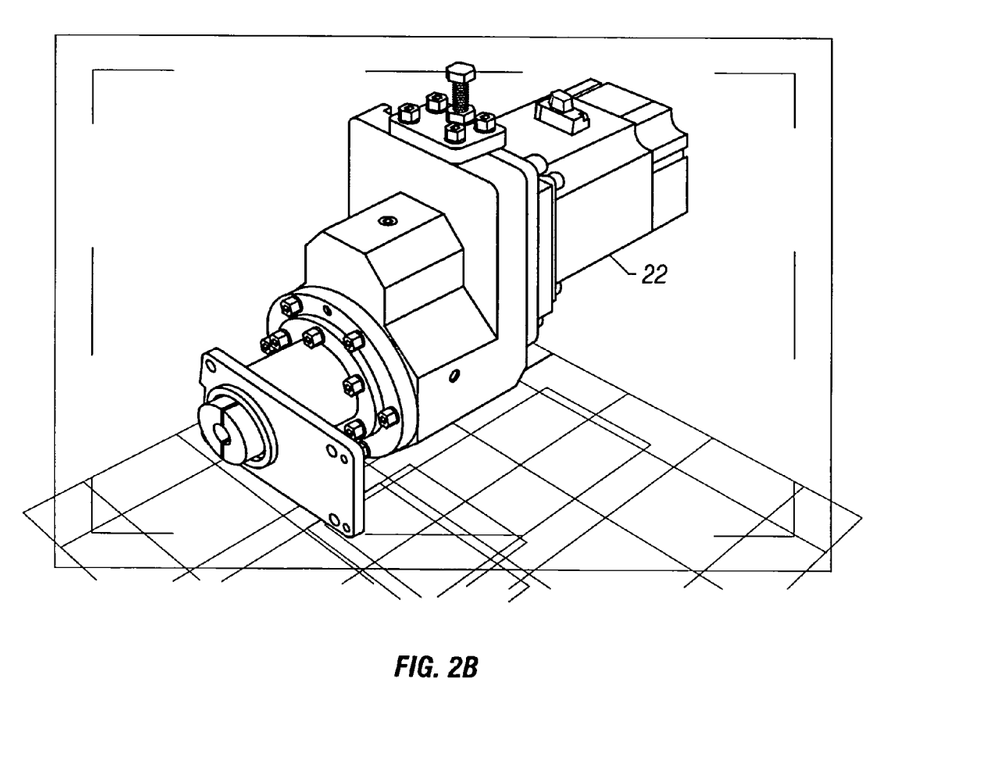

Once with this black block 20 of all assembled component models is produced, the black block is erased and the work of assembling the components by retrieving them one by one is begun (S14). Specifically, the coordinates of a component are input one by one, each component is positioned, and a complete assembly of the components on the screen is generated. The complete assembly 22 is thereby displayed as shown in FIG. 2B.

Figure 3:
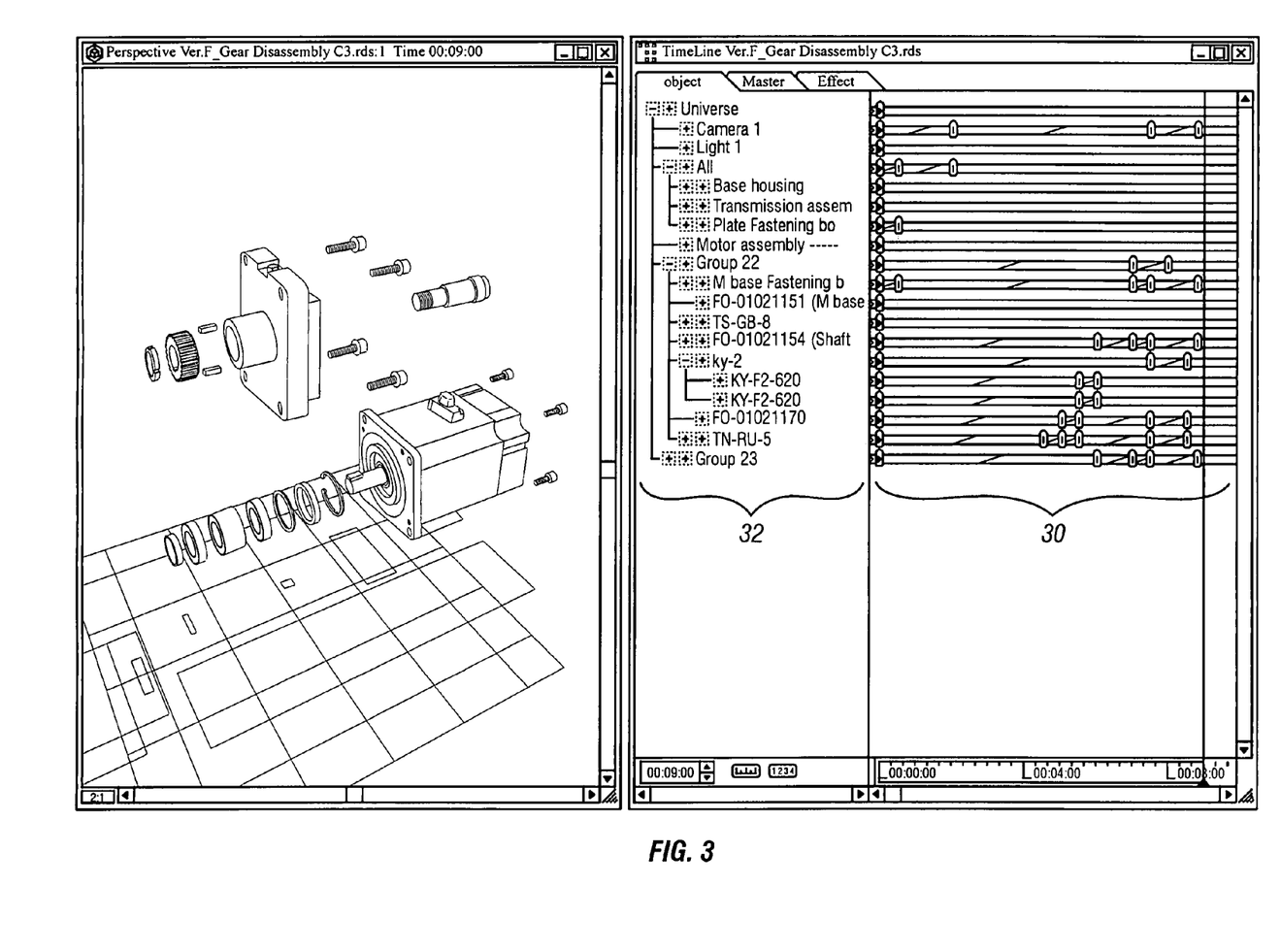
FIG. 3 is an illustration showing a display example of a timeline chart for each component.

Next, appropriate camera angle and position are selected, so that the disassembly and assembly of the components can be clearly expressed in animation (S15). Then, a timeline 30 (time chart), as shown in FIG. 3, is developed and the transparency of any component required to be transparent is set (S16). The component 32 that may be either static or dynamic when being displayed are listed and set in line on the vertical axis and represent time passage on the horizontal axis. For each component, the point at which the component will stop motion or begin to move is plotted on the timeline 30, thus developing a time schedule whereby the components will be animated. In this way, the motions of animation are preset.

During the process of developing the timeline, in addition, to a component selected to be transparent a time-scheduled transparency factor is assigned. These steps can be accomplished, for example, by clicking on a component and specifying a time when it will become transparent. At the same time, operators may specify a level of quasi-transparency to transparency to set the displayed component somewhat opaque or completely transparent.

Then, rendering qualities such as shading and coloring according to which the computer creates an image data file are specified (S17). Computer graphics are thereby displayed on the screen and a video file is created.

Especially, in this embodiment, data for a set of three-dimensional component models formed by combining a plurality of three-dimensional component models is imported into application software for animation. Because data for each component is thus held in this application software for animation, inner components can be rendered visible by specifying the transparency of outer components.

Figure 4:
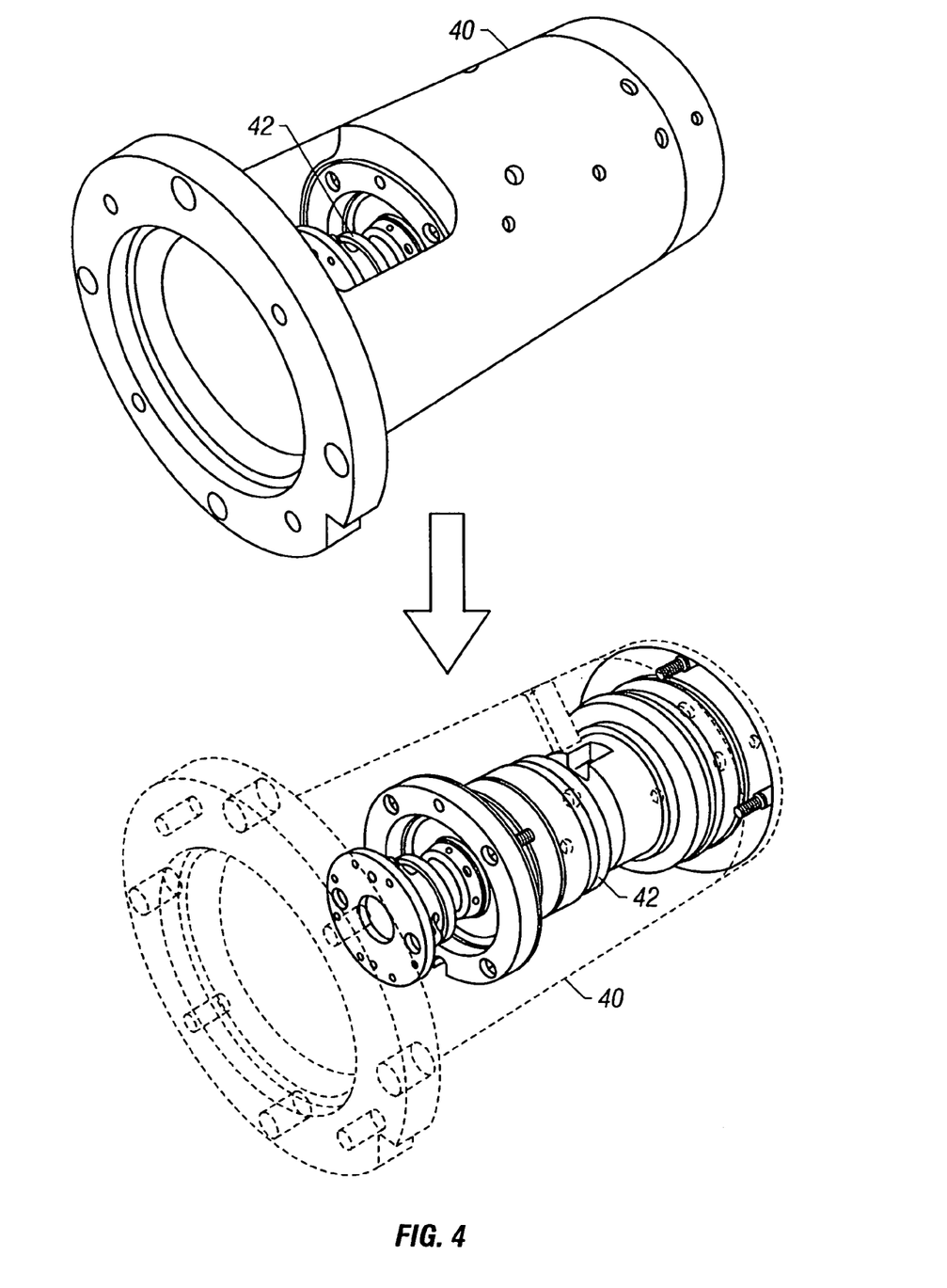
FIG. 4 is an illustration showing a display example of a perspective view of an assembly.

FIG. 4 shows an example of a perspective view thus obtained. When the casing 40 is not specified as transparent, the assembly 42 of the components inside the casing cannot be viewed. By specifying a transparent casing 40, the casing 40 is transparent when displayed and the internal assembly 42 can be observed.

Once a video file has been created by following the above procedure, HTML (Hyper Text Markup Language) is used to prepare a file into which the video file is inserted (S18). On this HTML file into which the video file has been located, a desired operation may be performed, for example, appending text to an image, setting disassembly or assembly to be executed by click action, or setting an image display to go forward after being confirmed by click action.

Executing animation based on the created HTML file will be explained below.

A case where the animation display on the screen automatically goes forward is first explained. On the initial screen on which the target machine is displayed, a mouse is used to click a predetermined position, for example, a portion of the area in which the machine is displayed. Then, animation images according to the disassembly and assembly procedure are automatically displayed at predetermined speed, until the process sequence is executed to the end.

Figure 5:
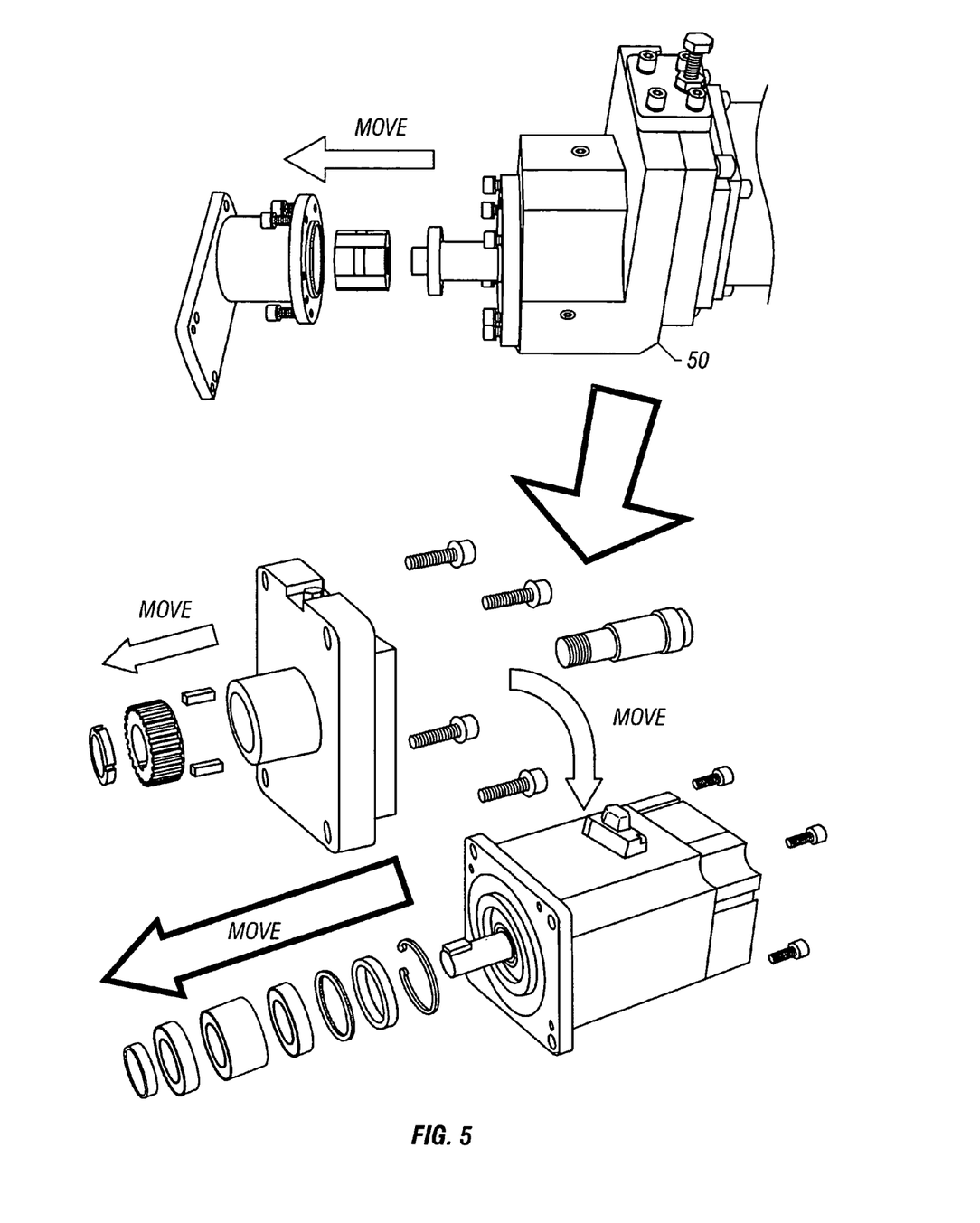
FIG. 5 is an illustration showing an example display when components are moved.

For disassembly procedure, all components of the machine 50 move as shown in FIG. 5 until the machine 50 as been completely broken down into discrete components, all of which are represented on the changing animation display. For assembly procedure, all components are assembled to the machine 50, as represented on the animation display. While the animation is being displayed, an automatic voice assistant explains the disassembly and assembly in detail, helping the viewer to more easily understand the disassembly or assembly process. When the animation is displayed with a voice explanation, the components are animated on the screen, based on the program that predetermines the motion and locus of the components, speech speed and timing, final arrays, and other details. The viewer is given realistic representation as watching a picture film or video. The voice file is located in the same array of the video file or assembled into the video file.

It may also be programmed that when a desired component is clicked from among the broken components after disassembly, information such as the component item number, name, quantity, and manufacturer are displayed. Thereby, component detail data can be obtained as necessary, which is convenient for component procurement.

Although the automatic animation display of disassembly and assembly can be viewed at a predetermined speed as described above, it is also appropriate that the viewer be prompted to confirm each step of disassembly and assembly. In disassembly and assembly procedure, almost identical operations are often repeated before the image display changes to the next step. For example, when removing a component, a plurality of bolts that secure a component may need to be removed and one component removed before operators proceed to the next step of removing another component. In such case, it is appropriate that the animation program await input (for example, a click with the mouse)

to confirm that the viewer is ready to receive explanation of the next component at the completion of all to be done for a single component.

Figure 6A:
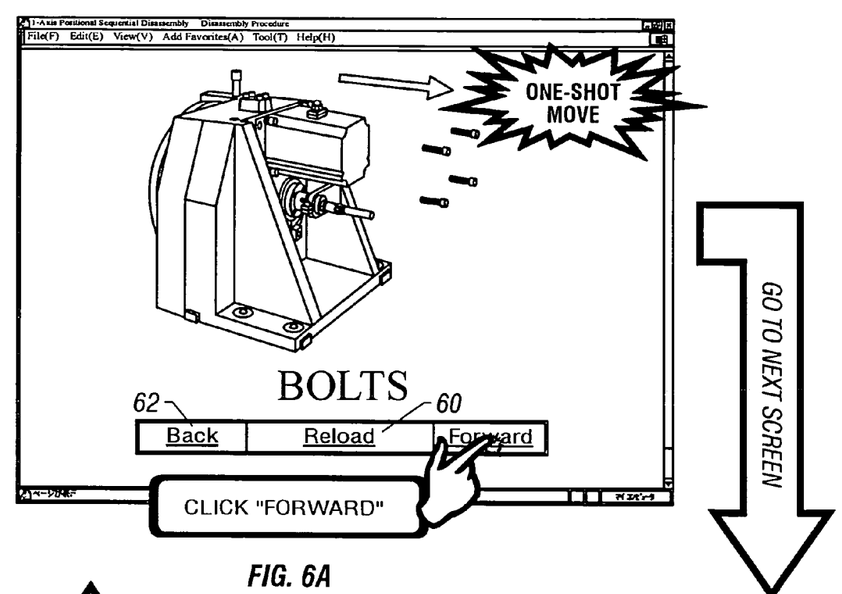
FIGS. 6A and 6B are illustrations explaining a change of the display screen.
Figure 6B:
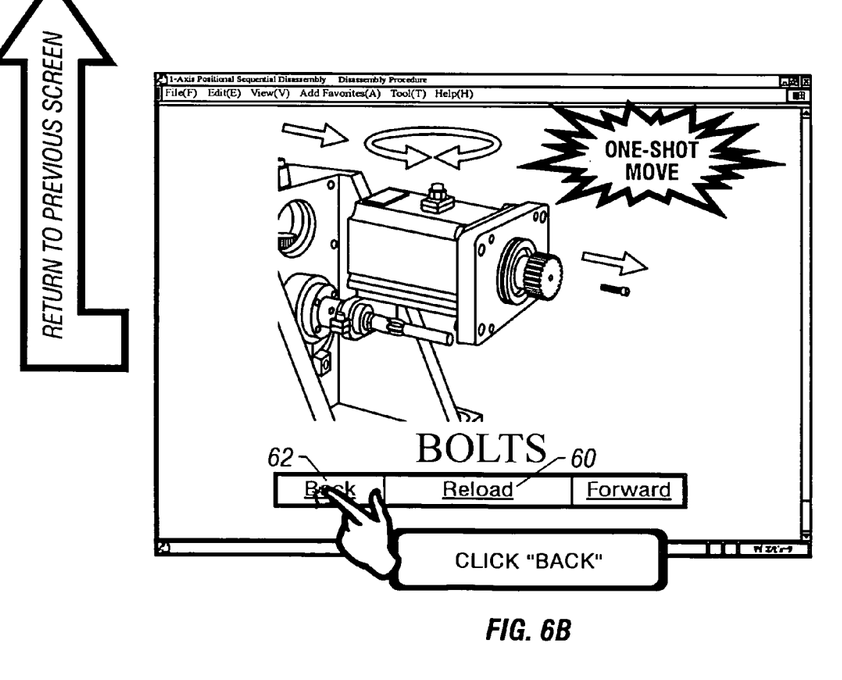

As shown in FIGS. 6A and 6B, the viewer may click on the "Reload" button 60 to cause the animation program to repeat the last animation sequence. The viewer also may click on the "Back" button 62 so that the animation program will again display the animation of the process step preceding the step just displayed.

In response to input in the above manner, the animation program can display explanatory animation that matches the process step that the operator will actually perform, thereby making the program easier for the operator to use. In particular, because operation guides or instructions developed using the present invention can be displayed on a terminal located near a place where the operator practically works, an interactive animation display can be significantly effective.

Such animation program can be executed from browsing software such as the readily available NETSCAPE (trademark) or INTERNET EXPLORER (trademark) browsers that can operate under a common operating system such as WINDOWS (trademark). Thus, the program can satisfactorily operate on an ordinary desktop or notebook personal computer. An operator may, for example, bring a notebook personal computer to a factory site where the target device is installed and run the animation program on the computer so that animation can be used at any time during practical work such as maintenance. An operator may also use the personal computer already installed at an appropriate site.

Because animation representation of process details are easy to understand, they can be understood without being supplemented with explanatory voice assistance. Animation programs according to the present invention can thus be effectively used at factories in diverse countries where multiple languages are spoken.

Especially, for a component to be rendered transparent, the shape of the component is first generated using 3-D CAD tools and then its transparency is specified with application software for animation. Thereby, a single component can be made totally transparent when being displayed. When a complex shape is generated using application software for animation, the shape as a single component is often hard to generate; as a general rule, a component is divided into multiple sub-components when being generated. When these sub-components are set to be transparent, however, unwanted shades are generated and clear transparency cannot be attained. This problem can be solved by using 3-D CAD to generate a component shape and then specifying its transparency using application software for animation.

When coloring the components during the rendering process, if a single component is painted with two or more different colors, it is desirable to generate another color-filming component for the area to be colored with another color and specify distinct colors for the color-filming component and the component except that area using application software for animation.

Figure 7A:
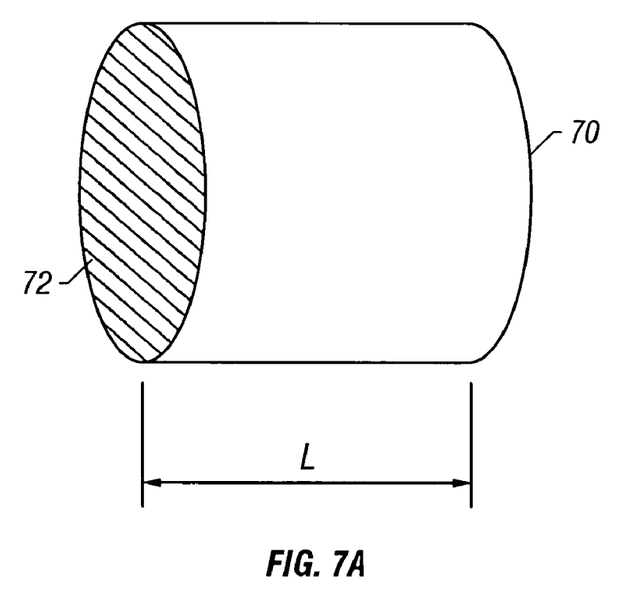
FIGS. 7A and 7B are illustrations explaining coloring of a partial area of a component.
Figure 7B:
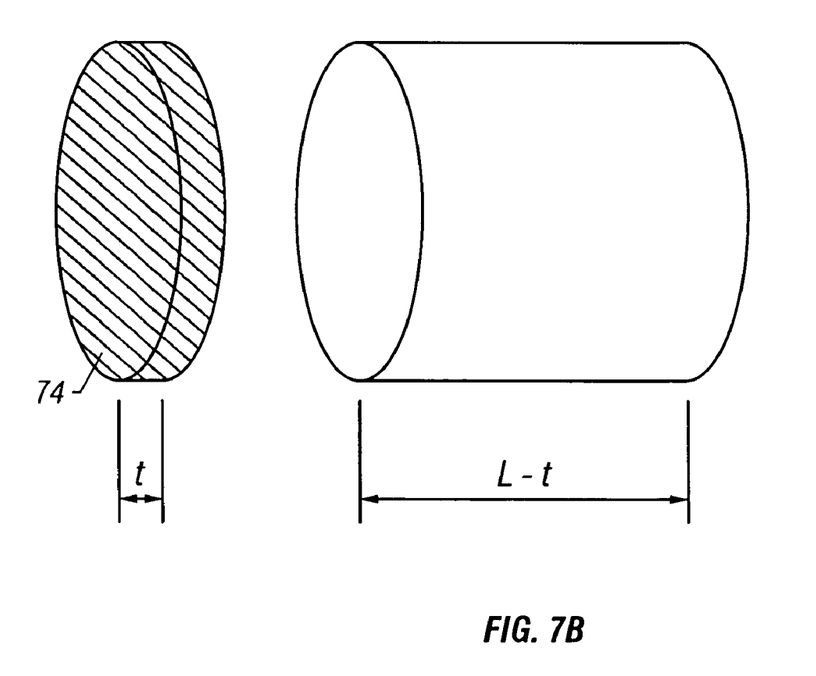

In an example of a cylindrical component 70 with length of L, as shown in FIGS. 7A and 7B, modeled to be white except for a bottom surface 72 colored black, a disk 74 with thickness of t (0.1 mm or less) is generated to the color attribute of which black is assigned. The height of the cylindrical component is set to (L-t) and white is assigned to the color attribute for the height component. The two components are separately modeled and then integrated into one component when positioned. The data quantity in the video file for animation can thereby be reduced. If one component is painted with different colors, the portions of the component must have separate color attributes, remarkably increasing data quantity. The above-described manner of specifying distinct colors for separate components can reduce the data quantity.

Figure 8:
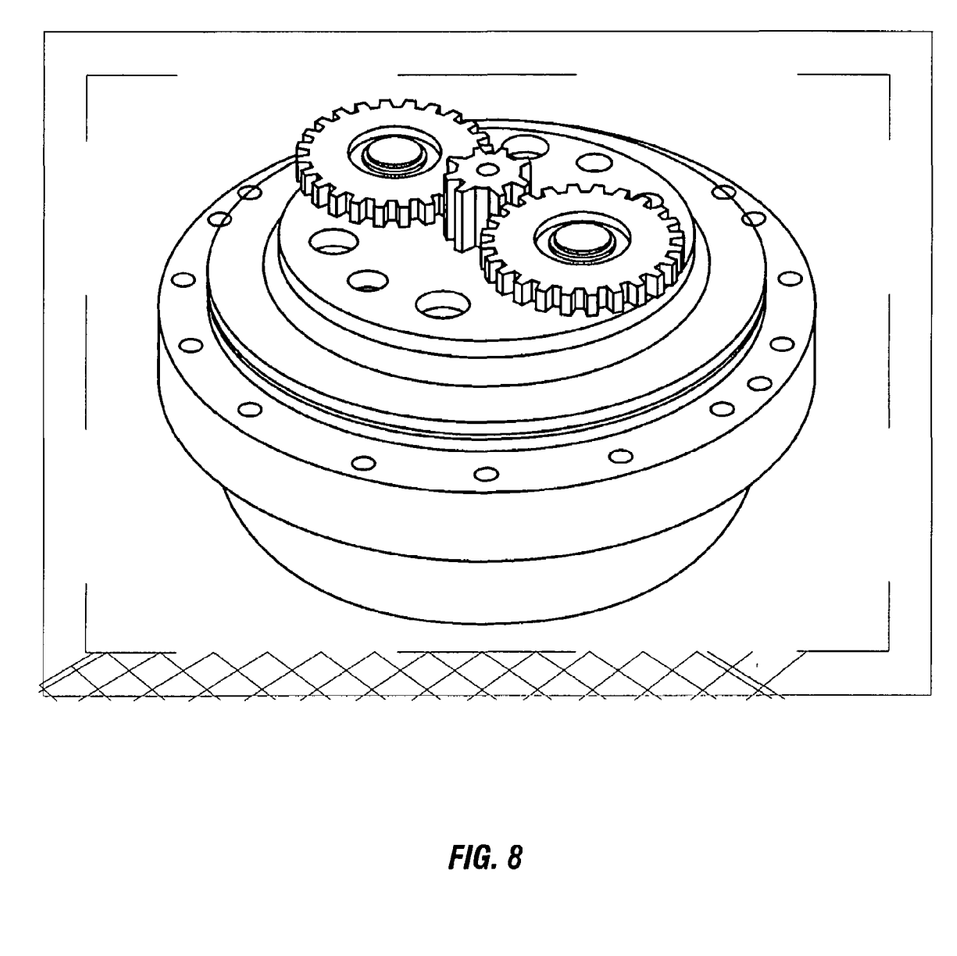
FIG. 8 is an illustration showing an example of display of independently moving component members.

A very complex and large component that is not specified as being transparent may be divided into multiple sub-components in the generating phase with 3-D CAD before modeling, so that the developing work can be performed efficiently. Components that eventually move in separate motions, as shown in FIG. 8, may be modeled as separate components, stored into the video file, and specified separately in the timeline so as to be set in distinct motions.

Furthermore, to reduce the 3-D CAD data quantity, it is appropriate to round dimensions to, for example, one decimal place for all components. Data reduction in this way is acceptable because animation display need only be sufficient for users to properly recognize how the components work, and need not be represented with the level of accuracy required when the components are manufactured.

Transparency need not be specified for each component, and the below described method of specifying transparency is also appropriate.

An assembled object (a given device, or a product) formed by combining multiple components are divided beforehand into a group of components to be rendered transparent and a group of components not to be rendered transparent. For example, a device is divided into a group A of outer components, such as a casing, and a group B of components attached therein, followed by creation of a picture. A picture here may be either an animated image or a static image.

Figure 9:
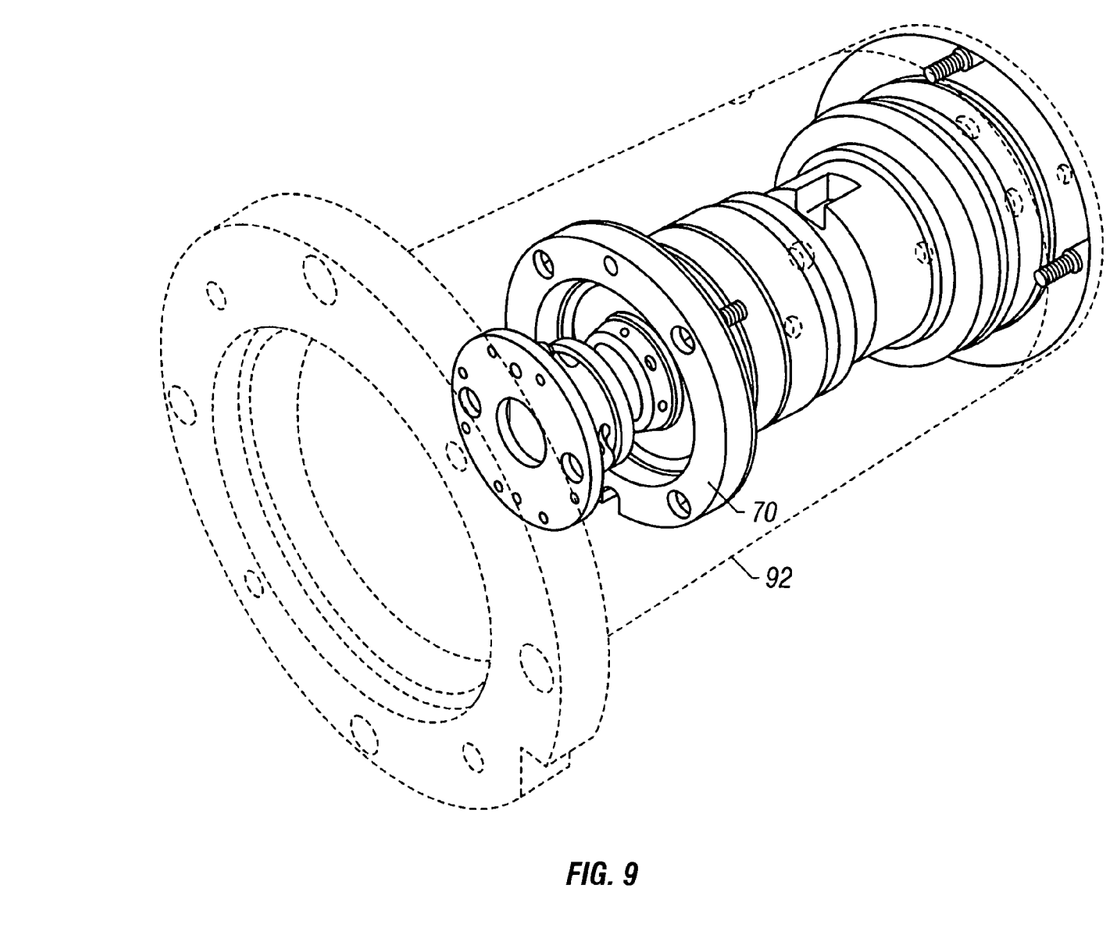
FIG. 9 is an illustration showing another display example of a perspective view of an assembly.

As shown in FIG. 9 transparency is assigned to the color attribute of the group A92, and pictures of the component groups A and B are displayed in an overlapping manner. As a result, a picture with the inner component group B90 visibly displayed can be obtained.

In specifying transparency for the component group A92, it is only necessary to assign a pale color to the color attribute of the component group A in the picture, so that an image equivalent to that obtained with the component group A92 is rendered transparent is attained when the picture of the group A92 is caused to overlap that of the group B90. Therefore, there is no need to specify each component as being transparent, thereby simplifying transparency specification process, and therefore reducing the time required for the process. Further, because the color attribute is assigned to the outer appearance of the component group to be rendered transparent, penetration holes and the like in invisible areas do not stand out in the image, and therefore a beautiful picture can be obtained. In addition, no data is required for the components which do not appear in the displayed image.

The method of creating animation image data files of this embodiment is utilized especially by manufacturers. In the field of manufacturing, a drawing is first created for a product to be manufactured, and used to actually manufacture the product. As the drawing is created with 3-D CAD tools, 3-D CAD data is often generated for each product. In building or remodeling new factory facilities as well, each facility is designed using 3-D CAD tools, and therefore 3-D CAD data is generated for various components making up the facility.

Meanwhile, instruction manuals describing operation and facility maintenance procedures are produced. However, these manuals printed on paper are not helpful enough for operators to understand the procedures. Even a moving picture of the operation procedures captured with a video camera does not sufficiently help operators to understand the working procedures because operators, other machines and devices, and components thereof in the picture block the view, or because viewers cannot see the inside.

On the other hand, animation images can provide a good explanation easily understood by viewers. However, creation of animated images requires an enormous amount of labor, and it is difficult to express accurate shapes with the animated images.

By utilizing the 3-D CAD data and converting it to be imported to application software for animation as in the present invention, an accurate shape can be easily created in the animation. Further, such animation can be viewed on a notebook personal computer by deleting unnecessary data and creating two-dimensional animation. Internal components can be made visible in animation by specifying them transparent, so that operation procedures can be presented without any operators and the like blocking the view, and thus easily understood by viewers.

Such explanation with animation basically eliminates the need for written or spoken description, and therefore operation procedures can be easily explained at factories in diverse countries where multiple languages are spoken.

Such explanation of operation procedures with animated images can also make it possible for anyone to easily perform recovery operation when a trouble occurs in the facility. Further, there is no need to store data for all recovery operations in the factory because it can be transferred by e-mails or acquired by accessing the host computer from a terminal at the factory.

The above-described animated image is preferably used for providing a presentation of various devices. The animation image created by using 3-D CAD data is highly accurate in size and the like, and thus can be used for a presentation to simulate a variety of motions of the actual device. Therefore, business persons selling the device may carry around the animated image file and show the file to customers using a notebook personal computer or the like, presenting a clear and easily understandable explanation of the device.

Preferably, the above product is a factory facility, and the above component is the device building up the facility. The created animation image is preferably used for providing a presentation of the factory facility.

While conventionally miniature models are made for planning a layout of factory facilities, it is difficult to imagine motion of devices and people with such models. On the contrary, using animation, motions of the devices and people can be easily simulated.

Although expressing elements in accurate shapes are difficult if animated image data must be created from scratch with animation, each element can be expressed in its accurate shape by importing the data formed with CAD into application software for animation.

It is also preferable to add data for human motion picture using application software for animation, to thereby easily simulate human motions.

The present invention also provides a medium on which the data files created as described above are stored. The medium may be in any form as long as data can be stored thereon, including a CD-ROM and a floppy disk. Data may also be provided through communication.

While the 3-D CAD model data is output in an STL-format, converted into a DXF-format file, and then imported to application software for animation, the data need not be imported into the software and may be supplied in other formats.

According to the present invention, as described above, animation for describing operation and the like can be created and components can be specified transparent or colored with different colors in an efficient manner, using 3-D CAD tools and application software for animation.

What is claimed is:

1. A method of creating animation image data files, comprising the steps of:
    generating individual three-dimensional models of components of a given device using a three-dimensional CAD system, and combining a plurality of generated three-dimensional component models to form a set of three-dimensional component models of the given device, thereby forming data for the set of three-dimensional component models of the given device; and
    importing the data of the thus obtained set of three-dimensional component models into application software for animation, holding data of the thus obtained set of three-dimensional component models in the application software for animation, wherein the holding comprises:
        coloring the components using a function of application software for animation, and
        specifying the transparency of an outer component, so that an inner component is rendered visible on a display, wherein a function is capable of specifying a degree of transparency along with a time for each component so that the degree of transparency can be changed in relation to a timeline for animation.

2. The method of according to claim 1, wherein:
    when performing said operation of specifying the transparency of a component, a component to become transparent after a certain elapsed display time can be preset by specifying a time at which the component becomes transparent.

3. The method according to claim 1, wherein:
    when performing said operation of specifying the transparency of a component, a level of transparency can be specified.

4. A method of creating animation image data files, comprising the steps of:
    generating individual three-dimensional models of components of a given device using a three-dimensional CAD system, and combining a plurality of generated three dimensional component models to form a set of three-dimensional component models of the given device; and
    importing the thus obtained set of three dimensional component models of the given device into application software for animation, coloring the components using a function of application software for animation, generating a tenuous color-filming component that fits the shape of a partial surface of a desired component, wherein the tenuous color-filming component is a separate component from the desired component, and specifying a certain color of said color-filming component to color the partial surface of the component, and wherein a uniquely defined, mono-colored film is prepared as a separate member from an object, so that the film is attached to a part of the object for color discrimination.

5. The method according to claim 4, wherein:
    said partial surface of a component is flat.

6. A method of creating animation image data files, comprising the steps of:
generating individual three-dimensional models of components of a given device using a three-dimensional CAD system, and combining a plurality of generated three-dimensional component models to form a set of three-dimensional component models of the given device;
importing the thus obtained set of three-dimensional component models of the given device into application software for animation, and creating an image for each component using a function of application software for animation;
combining said components to form separate groups of components to be rendered transparent and not to be rendered transparent; and
displaying images of both said groups of components in an overlapping manner, so that internal components are visible on a display in relation to a timeline for animation.

7. The method according to claim 1, wherein the created animation image is used for describing assembly and disassembly processes to maintain a given device.

8. The method according to claim 1, wherein said animation image is used for presentation of said given device.

9. The method according to claim 8, wherein said given device is a factory facility, said component is the device building up the facility, and the created animation image is used for presentation of the factory facility.

10. The method according to claim 9, wherein an interactive picture is added using application software for animation.

11. A medium on which is stored the data file created by the method according to claim 1.

12. The method according to claim 1, wherein the specifying the transparency of a component is by varying levels of transparency.

13. A method of creating animation image data files, comprising the steps of:
generating individual three-dimensional models of components of a given device using a three-dimensional CAD system, and combining a plurality of generated three-dimensional component models to form a set of three-dimensional component models of the given device, thereby forming data for the set of three-dimensional component models of the given device; and
importing the data of the thus obtained set of three-dimensional component models into application software for animation, holding data of the thus obtained set of three-dimensional component models in the application software for animation, wherein the holding comprises:
coloring the components using a function of application software for animation, and
specifying the transparency of an outer component, so that an inner component is rendered visible on a display, wherein a function is capable of specifying a degree of transparency for each component so that a different degree of transparency can be set for each component in relation to a timeline for animation.

14. A method of creating animation image data files, comprising the steps of:
generating individual three-dimensional models of components of a given device using a three-dimensional CAD system, and combining a plurality of generated three-dimensional component models to form a set of three-dimensional component models of the given device, thereby forming data for the set of three-dimensional component models of the given device; and
importing the data of the thus obtained set of three-dimensional component models into application software for animation, holding data of the thus obtained set of three-dimensional component models in the application software for animation, wherein the holding comprises:
coloring the components using a function of application software for animation, and
specifying the transparency of an outer component, so that an inner component is rendered visible on a display, wherein a function is capable of specifying a degree of transparency along with a time for each component so that the degree of transparency can be changed in relation to a timeline for animation, and wherein a function is capable of specifying a degree of transparency for each component so that a different degree of transparency can be set for each component.

* * * * *